United States Patent [19]

Yuyama

[11] Patent Number: 4,754,614
[45] Date of Patent: Jul. 5, 1988

[54] PRIME-MOTOR-DRIVEN ROOM WARMING/COOLING AND HOT WATER SUPPLYING APPARATUS

[75] Inventor: Hiroshi Yuyama, Shizuoka, Japan

[73] Assignee: Mitsubishi Denki Kabushiki Kaisha, Tokyo, Japan

[21] Appl. No.: 12,281

[22] Filed: Feb. 9, 1987

[30] Foreign Application Priority Data

Feb. 7, 1986 [JP] Japan .................................. 61-25431
Aug. 19, 1986 [JP] Japan ................................. 61-193133

[51] Int. Cl.⁴ ............................................. F25B 27/00
[52] U.S. Cl. .................................... 62/238.6; 237/2 B
[58] Field of Search ....................... 62/238.6; 237/2 B

[56] References Cited

U.S. PATENT DOCUMENTS 4,614,090 9/1986 Kaneko et al. ..................... 62/238.6

FOREIGN PATENT DOCUMENTS 58-86366 5/1983 Japan .
58-71661 5/1983 Japan .

Primary Examiner—Lloyd L. King
Attorney, Agent, or Firm—Oblon, Fisher, Spivak, McClelland & Maier

[57] ABSTRACT

A prime-motor-driven room-warming/cooling and hot water supplying has a heat exchanger which includes each part of a cooling water circulating circuit, a supplied water circuit, a refrigerant heating circuit and a supplied water heating circuit so as to perform mutual heat exchanging of cooling water for the prime motor in the water heating circuit, the refrigerant in the supplied water heating circuit and the refrigerant in the refrigerant heating circuit.

8 Claims, 5 Drawing Sheets

PRIME-MOTOR-DRIVEN ROOM WARMING/COOLING AND HOT WATER SUPPLYING APPARATUS

BACKGROUND OF THE INVENTION

1. FIELD OF THE INVENTION

The present invention relates to a prime-motor-driven room warming/cooling and hot water supplying apparatus in which a compressor for a heat pump is driven by a prime motor and a heat generated from the motor is recovered and utilized as auxiliary heat sources for room warming and hot water supplying.

2. DISCUSSION OF THE BACKGROUND

There have been proposed two types of prime-motor-driven room warming/cooling and hot water supplying apparatus, i.e. one in which cooling water for cooling a prime motor is directly introduced into a heat radiator placed in a room to warm the room and the other in which a refrigerant in a heat pump circuit is heated by cooling water for cooling the prime motor so that the heated refrigerant is utilized for room warming.

FIG. 7 is a diagram showing a refrigerant and hot water circuit used for the latter type of the apparatus.

In FIG. 7, a reference numeral 1 designates a prime motor, a numeral 2 a clutch, a numeral 3 a compressor connected to the prime motor 1 through the clutch 2, a numeral 4 a four-way valve, a numeral 5 a room side heat exchanger, a numeral 6 a room side air blower for the room side heat exchanger 5, a numeral 7 an outdoor side heat exchanger, a numeral 8 an outdoor air blower for the outdoor side heat exchanger 7, a numeral 9 a receiver, and a numeral 10 a throttling device such as an expansion valve. The compressor 3, the room side heat exchanger 5, the outdoor side heat exchanger 7, the receiver 9 and the throttling device 10 are connected by tubes to form a heat pump circuit 30. Check valves 11-14 and electromagnetic valves 15, 16 are also interposed in the heat pump circuit 30. A supplied water circuit 31 is connected to the heat pump circuit 30 through the electromagnetic valve 16, and the water heating circuit 31 is formed by connecting a water tank 19, a water circulating pump 20, a first heat exchanger 17 for exchanging heat between the refrigerant in the heat pump circuit 30 and water to be supplied from the water tank 19 and a second heat exchanger 18 for exchanging heat between water for cooling the prime motor 1 and the water supplied from the water tank 19. The water tank 19 is provided with a water feeding pipe 21 at its bottom and a water feeding valve 22 at its upper part.

A cooling water circulating circuit 32 comprises a cooling system provided in the prime motor 1, a cooling water pump 23, an electromagnetic valve 24 and the second heat exchanger 18. A series connection of on electromagnetic valve 25 and a refrigerant heating heat exchanger 27 is connected in parallel to the cooling water circulating circuit 32 with respect to the prime motor 1.

A refrigerant heating circuit 33 comprises a refrigerant feeding pump 26, the refrigerant heating heat exchanger 27 and a check valve 28, and it extends from a joint portion between the receiver 9 and the throttling device 10 of the heat pump circuit 30 to a joint portion between the four-way valve 4 and the room side heat exchanger 5. The electromagnetic valve 15 is interposed between the four-way valve 4 and the room side heat exchanger 5.

A piping arrangement including the room side heat exchanger 5, the electromagnetic valves 16, and a first heat exchanger 17 for exchanging heat between the refrigerant and water to be supplied from the water tank 19 constitutes a supplied water heating circuit 34. A reference numeral 35 designates a water temperature sensor.

The operation of the conventional room warming/cooling and hot water supplying apparatus having the construction as above-mentioned will be described.

The operation for room cooling or room warming is performed by a known heat pump method by switching the four-way valve 4. Namely, in the room cooling operation, heat is taken from a room air by the room side heat exchanger 5 and the heat is radiated outside by the outdoor side heat exchanger 7. In the room warming operation, heat is taken from the atmosphere by the outdoor side heat exchanger 7 and the heat is radiated in the room by the room side heat exchanger 5. The check valves 11, 12, 13, 14 function to feed the refrigerant from the receiver 9 to the throttling device 10 by switching the four-way valve 4.

In the operation for heating water by utilizing the heat pump, the electromagnetic valve 15 is closed and the electromagnetic valve 16 is opened so that the heat of the refrigerant is radiated at the first heat exchanger (in this case, heat is taken from the outer air by means of the outdoor side heat exchanger 7). On the other hand, water is forcibly supplied from the water tank 19 by the water circulating pump 20 to be introduced in the first exchanger 17 where the water is heated by heat-exchanging with the refrigerant, and then the hot water is returned to the water tank 19.

During room warming, room cooling or hot water supplying operation, the compressor 3 is driven by the prime motor 1. Therefore, it is necessary to cool the prime motor. For this, the cooling water is circulated in the cooling water circulating circuit 32 by the cooling water pump 23. Namely, the cooling water is circulated in the course of the cooling water pump 23, the prime motor 1, the electromagnetic valve 24, the second heat exchanger 18 where the temperature of the cooling water is elevated at a high level by a waste heat from the prime motor 1. The water from the water tank 19 is circulated in the supplied water circuit 31 in the course of the water tank 19, the water circulating pump 20, the first heat exchanger 17, the second heat exchanger 18 to be returned to the tank 19. Since the electromagnetic valve 16 is closed during the room cooling or the room warming operation, the water is heated by only the second heat exchanger 18. However, in the hot water supplying operation by utilizing the heat pump, the water is heated by both the first and second heat exchangers 17, 18 by closing the electromagnetic valve 15 while the electromagnetic valve 16 opened. The cooling water circulating pump 20 is usually operated since the waste heat from the prime motor 1 can be utilized to elevate the temperature of the cooling water.

When a load for room warming is relatively high in the room warming operation and the temperature of water in the water tank 19 becomes higher than that of the cooling water for cooling the prime motor 1, it is impossible to radiate the heat in the cooling water in the second heat exchanger 18. In this case, the electromagnetic valve 24 is closed and at the same time the electromagnetic valve 25 is opened whereby the cooling water is circulated in the refrigerant heating heat exchanger 27. At the same time, the refrigerant pump 26 is driven to perform heat-exchanging, in the refrigerant heating heat exchanger 27, between the cooling water for the prime motor 1 and the liquefied refrigerant in the receiver 9. Then, the temperature of the cooling water is decreased and the liquefied refrigerant from the receiver 9 becomes gas, which is passed through the check valve 28 and is combined with the refrigerant supplied from the compressor 3 through the four-way valve 4. The refrigerant is fed into the room side heat exchanger 5 where heat is radiated in the room. Thus, an additional amount of the refrigerant from the receiver 9 is combined with an amount of the refrigerant from the compressor 3, which is fed at the ordinary rate, and accordingly, the increased amount of the refrigerant is supplied to the room side heat exchanger 5 to thereby enhance the performance of room warming operation of the room side heat exchanger 5. Thus, the heat generated from the prime motor is utilized to prevent reduction in the performance of the room warming in the case that the outer temperature is low while a load of room warming is large.

When the temperature of the water in the water tank 19 increases and it is difficult to heat the water in the water tank 19 by the heat of the cooling water for the prime motor 1, the water temperature sensor 35 detects the temperature of the cooling water so that the electromagnetic valves 24, 25 are operated to circulate the cooling water to the refrigerant heating heat exchanger 27.

Thus, in the conventional room warming/cooling and hot water supplying apparatus constructed as above-mentioned, it is necessary to provide in an outdoor unit with the refrigerant heating heat exchanger 27, the first heat exchanger 17 for transmitting the heat of the refrigerant to the water to be supplied to the oil tank and the second heat exchanger 18 for transmitting the heat of the cooling water to the water to be supplied to the water tank. Further, since the heat exchanging is carried out between the refrigerant flowing in the refrigerant heating circuit 33 and the cooling water in the refrigerant heating heat exchanger 27 by switching the electromagnetic valves 24, 25 during the room warming operation, it is necessary to provide the water temperature sensor 35 for detecting the temperature of the cooling water for cooling the prime motor 1 and the electromagnetic valves 24, 25 for switching the cooling water circulating circuit 32. In addition, it is also necessary to provide a space for locating the refrigerant heating heat exchanger 27 and the second heat exchanger 18. Accordingly, the volume and the weight of the apparatus become large.

Although the prime-motor-driven room warming/cooling and hot water supplying apparatus reduces cost for operations in comparison with the apparatus of an electric-motor-driven type, it requires the prime motor and its accessories, which inevitably increase the weight and the installation space. An attempt of improving the performance of room warming by heating the refrigerant, increases the number of heat exchangers thereby resulting in increase of weight and the manufacturing cost.

SUMMARY OF THE INVENTION

It is an object of the present invention to provide a prime-motor-driven room warming/cooling and hot water supplying apparatus which reduces the weight of and a space for a heat exchanger and other elements, has a simple structure and reduces the manufacturing cost.

The foregoing and the other objects of the present invention have been attained by providing a prime-motor-driven room-warming/cooling and hot water supplying apparatus which comprises a heat pump circuit including a compressor driven by a prime motor, a room side heat exchanger, a throttling device, a receiver and an outdoor side heat exchanger, a cooling water circulating circuit for circulating cooling water to cool the prime motor, a supplied water circuit for heating water by the heat of condensation of a refrigerant and by collecting heat generated from the prime motor, a refrigerant heating circuit extending from the intermediate of a pipe line connecting the receiver and the throttling device to the room side heat exchanger to feed the refrigerant heated, a supplied water heating circuit for circulating the refrigerant of a high temperature from the compressor, and a third heat exchanger which includes part of each of the cooling water circulating circuit, the water heating circuit, the refrigerant heating circuit and the supplied water heating circuit so as to perform mutual heat exchanging of the cooling water for the prime motor in the water heating circuit, the refrigerant in the supplied water heating circuit and the refrigerant in the refrigerant heating circuit.

BRIEF DESCRIPTION OF THE DRAWINGS

Other objects and many of the attendant advantages of the present invention will be readily appriciated as the same becomes better understood by reference to the following detailed description when considered in connection with the accompanying drawings, in which like reference numerals designate the same or similar parts throughout the figures thereof and wherein.

DETAILED DESCRIPTION OF PREFERRED EMBODIMENTS

Figure 1:
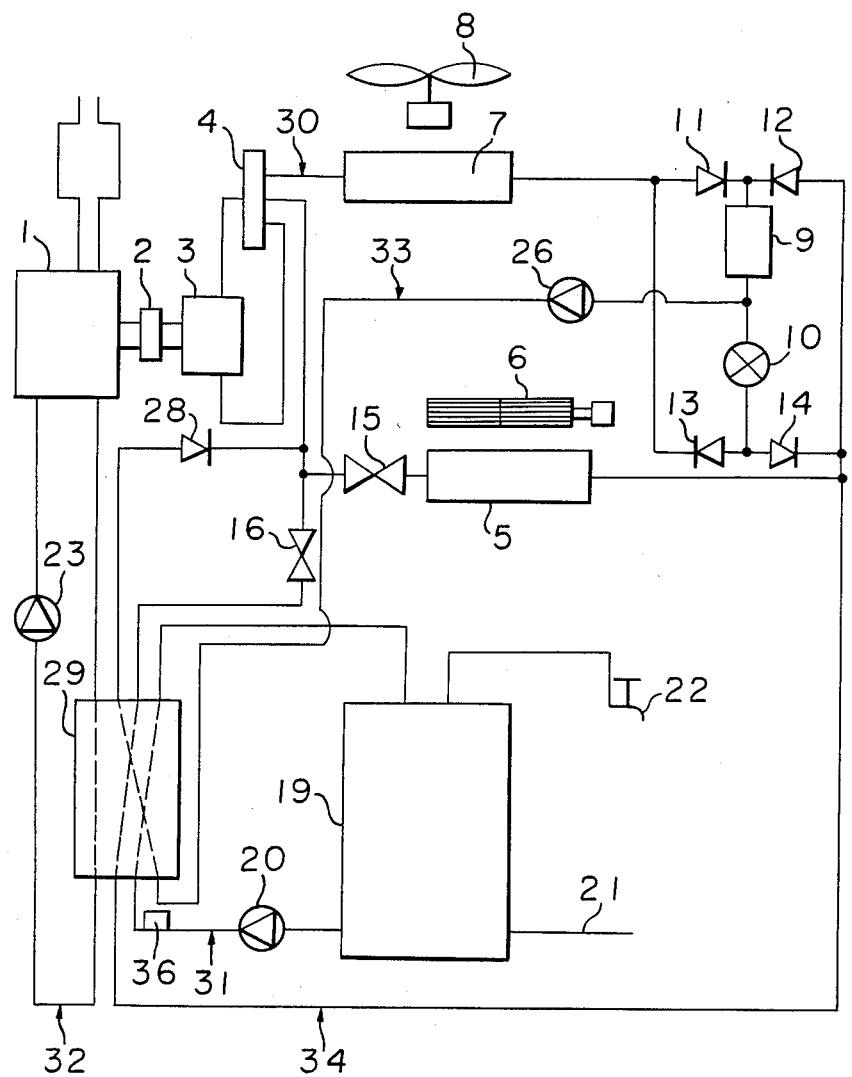
FIG. 1 is a refrigerant and water circuit diagram showing an embodiment of the prime-motor-driven room warming/cooling and hot water supplying apparatus of the present invention.
Figure 2:
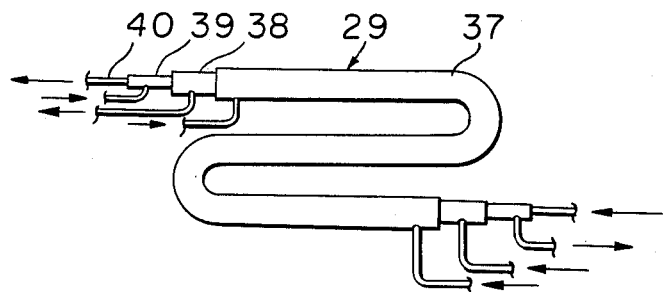
FIG. 2 is a front view of an embodiment of the heat exchanger for heat-exchanging between cooling water and water to be supplied to a water tank and between a refrigerant and the water to be supplied to the water tank.
Figure 3:
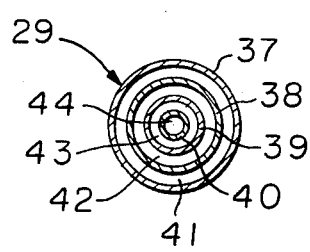
FIG. 3 is an enlarged cross-sectional view of the heat exchanger shown in FIG. 2.
Figure 7:
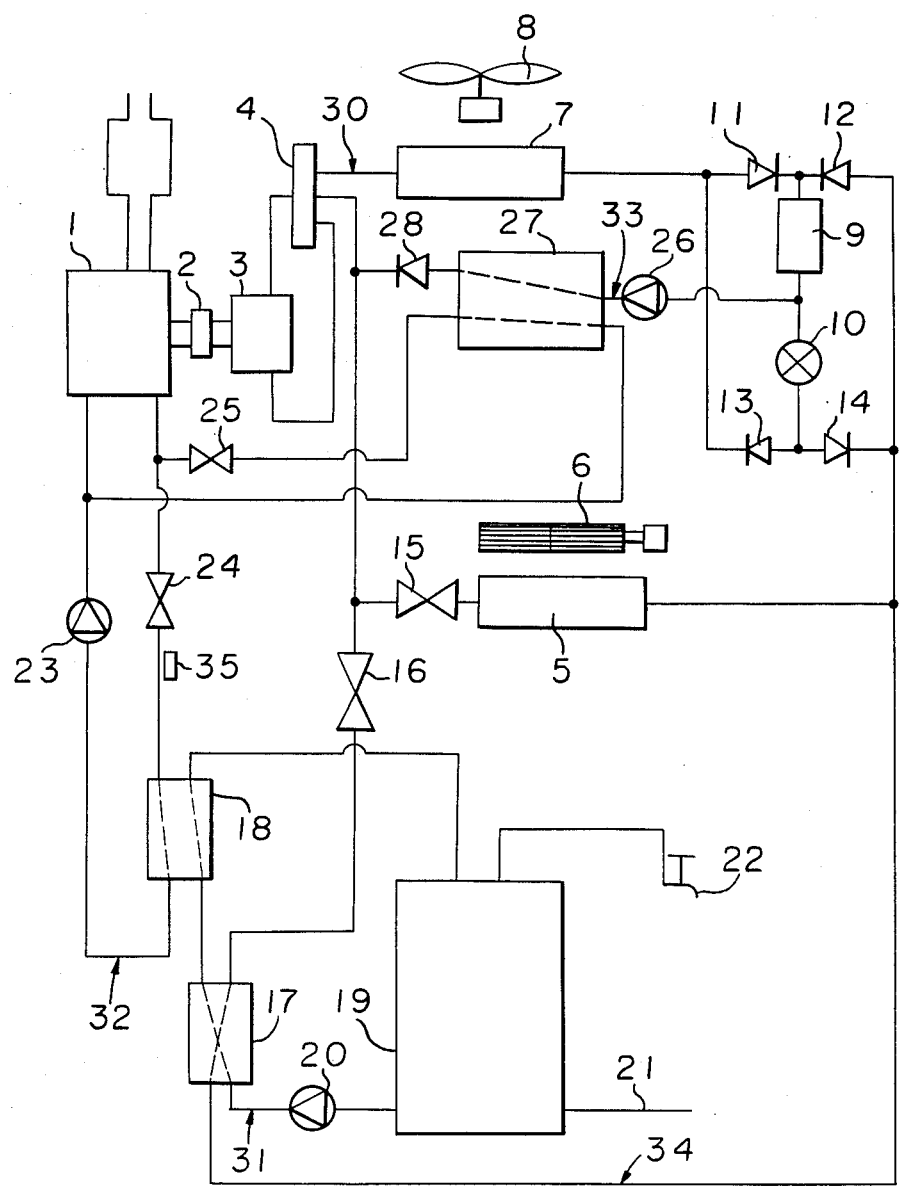
FIG. 7 is a diagram showing a refrigerant and water circuit of a conventional prime-motor-driven room warming/cooling and hot water supplying apparatus.

FIGS. 1 to 3 show the first embodiment of the present invention, in which the same reference numerals as in FIG. 7 designate the same or corresponding parts and therefore, description of these parts is omitted.

A reference numeral 29 designates a heat exchanger which functions for heat exchanging between the cooling water circulated in the cooling water circulating circuit 32 to cool the prime motor 1 and the water circulated in the water heating circuit 31 or the refrigerant passed in the refrigerant heating circuit 33, and between the water circulated in the supplied water circuit 31 and the supplied water heating circuit 34 (this heat exchanger constitutes the third heat exchanger in addition to the room side heat exchanger 5 and the outdoor side heat exchanger 7 and accordingly, it is referred to as the third heat exchanger). The third heat exchanger 29 may be formed by four heat exchanging tubes each having a different diameter and put one in the others in a telescopic form wherein different fluids are passed through gaps formed between the tubes. A temperature sensor 36 such as a thermoswitch is provided on the supplied water circuit 31 in the vicinity of the third heat exchanger 29. The same function is obtainable even by providing the temperature sensor 36 below the water tank 19. In the embodiment, it is important that the third heat exchanger 29 plane performs the function of hot water heat exchange under all operational modes.

In first embodiment of the present invention, the water to be supplied is circulated from the water tank 19 through the water pump 20 and the third heat exchanger 29 to be returned to the tank 19.

The cooling water is passed through the cooling water pump 23, the prime motor 1, the third heat exchanger 29 and is returned to the cooling water pump 23. Accordintly, the heat generated from the prime motor 1 is always utilized to heat the water to be supplied to the water tank 19 during the room warming-/cooling operations and the hot water supplying operation.

When the refrigerant in the heat pump circuit is used to heat the water to be supplied to the water tank 19, the electromagnetic valve 15 is closed while the electromagnetic valve 16 is opened to circulate the refrigerant having a high temperature and high pressure in the supplied water heating circuit 34, whereby the water supplied from the water tank by means of the water pump 20 is heated. In this case, the water is also heat-exchanged with the cooling water which is forcibly fed by the cooling water pump 23.

When room warming operation is to be carried out by heating the refrigerant, the refrigerant pump 26 interposed in the refrigerant heating circuit 33 is driven so that a part of the refrigerant in the receiver 9, which is condensed in the room side heat exchanger 5 for room warming, is drawn from the throttling device 10 side and forcibly supplied to the third heat exchanger 29 where the liquefied refrigerant is heated by the cooling water having passed in the prime motor 1 and becomes gas. The gaseous refrigerant is supplied to the room side heat exchanger 5 through the check valve 28. Thus, the refrigerant contributes to increase the performance of warming.

FIGS. 2 and 3 show an embodiment of the third heat exchanger. In FIGS. 2 and 3, a reference numeral 37 designates an outer tube, a numeral 38 designates a first heat transmission tube placed inside the outer tube 37, a numeral 39 designates a second heat transmission tube placed inside the first heat transmission tube 38 and a numeral 40 designates a third heat transmission tube placed inside the second heat transmission tube 39. These tubes 37, 38, 39, 40 have the same axial center and arranged in a telescopic form. A passage 41 of the refrigerant flowing from the heat pump circuit is formed between the inner surface of the outer tube 37 and the outer surface of the first heat transmission tube 38, a passage 42 for feeding the water to be supplied to the water tank 19 is formed between the first and second heat transmission tubes, a passage 43 for feeding the cooling water is formed by the second and third heat transmission tubes, and a passage 44 for feeding the liquefied refrigerant forcibly supplied by the refrigerant pump is formed inside the third heat transmission tube 40. In the third heat exchanger 29 having the construction as above-mentioned, the water to be supplied to the water tank 19 which flows in the passage 42 and the refrigerant which flows in the passage 44 are subjected to heat transmission by the cooling water which absorbs the heat generated from the prime motor 1, the cooling water flowing in the passage 43 formed between the second and third heat transmission tubes. The water to be supplied to the water tank 19, which flows in the passage 42 formed between the first and second heat transmission tubes 38, 39, can also be heated by the refrigerant flowing the passage 41 formed between the outer tube 37 and the first transmission tube 38. The third heat exchanger 29 is constructed in such a manner that as shown in FIG. 2, the fluids to be heat-exchanged are supplied in the opposite direction.

The cooling water is always circulated by the cooling water pump 23 during the operation of the prime motor 1.

When the room is to be cooled and hot water is to be supplied, the refrigerant does not flow inside the third heat transmission tube 40, since the refrigerant pump 26 is not operated. Accordingly, the heat exchanging is carried out between the cooling water and the water to be supplied to the water tank 19. However, when the room warming operation is to be carried out by heating the refrigerant, the refrigerant pump 26 is actuated to feed the refrigerant in the passage 44 inside the third heat transmission tube 40, whereby both the water supplied to the water tank 19 and liquefied refrigerant are heat-exchanged with the cooling water.

When the hot water is to be supplied, the refrigerant of a high temperature and a high pressure flows inside the outer tube 37. Accordingly, the water flowing inside the first heat transmission tube is subjected to heat exchanging with both the cooling water and the refrigerant of a high temperature.

In this embodiment, the diameter of the tubes may be selected to provide suitable cross-sectional area of the passages of the fluids depending on the flow rate and the heat transmission characteristics of the fluids. Further, fins and/or grooves may be formed on the surface of the tubes.

Although each of the tubes is formed in a zig-zag form in FIG. 2, they may be formed in a coiled shape.

Figure 4:
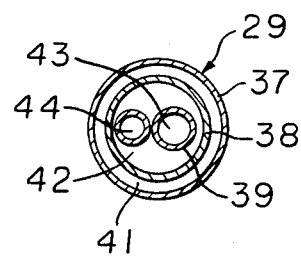
FIG. 4 is an enlarged cross-sectional view of another embodiment of the heat exchanger according to the present invention.

FIG. 4 shows another embodiment of the third heat exchanger of the present invention. In FIG. 4, the first heat transmission tube 38 is placed inside the outer tube 37, and the second and third heat transmission tubes 39, 40 are placed in parallel to and in contact with each other in the first heat transmission tube 38. The passage 41 for feeding the refrigerant from the heat pump circuit is formed inside the outer tube 37, the passage 42 for feeding the water to be supplied to the water tank is formed inside the first heat transmission tube 38, the passage 43 for feeding the cooling water is formed in the second heat transmission tube 39 and the passage 44 for feeding the requfied refrigerant is formed in the third heat transmission tube 40. Heat exchanging is carried out between two kinds of fluids respectively flowing inside and outside of each of the tubes. As the same manner as the first embodiment, the cooling water flows in the direction opposite the flow of the liquefied refrigerant, and the water to be supplied to the water tank flows in the direction opposite the refrigerant flowing from the heat pump circuit.

It is necessary that the second and third heat transmission tubes are in close-contact with each other to give efficient heat-exchanging between the cooling water and the liquefied refrigerant during the refrigerant heating operation. For this, the second and third heat transmission tubes are previously bonded together or are formed in one piece. When the temperature of the water to be supplied to the water tank is higher than the temperature of the liquefied refrigerant, the liquefied refrigerant can be heated by the water from the outer surface of the third heat transmission tube 40 to thereby improve the performance of room warming operation. Contrary, when the temperature of the water is lower than the temperature of the liquefied refrigerant, the operation of the water pump 20 is controlled or is entirely stopped so that the performance of room warming operation of the room side heat exchanger is increased.

Figure 5:
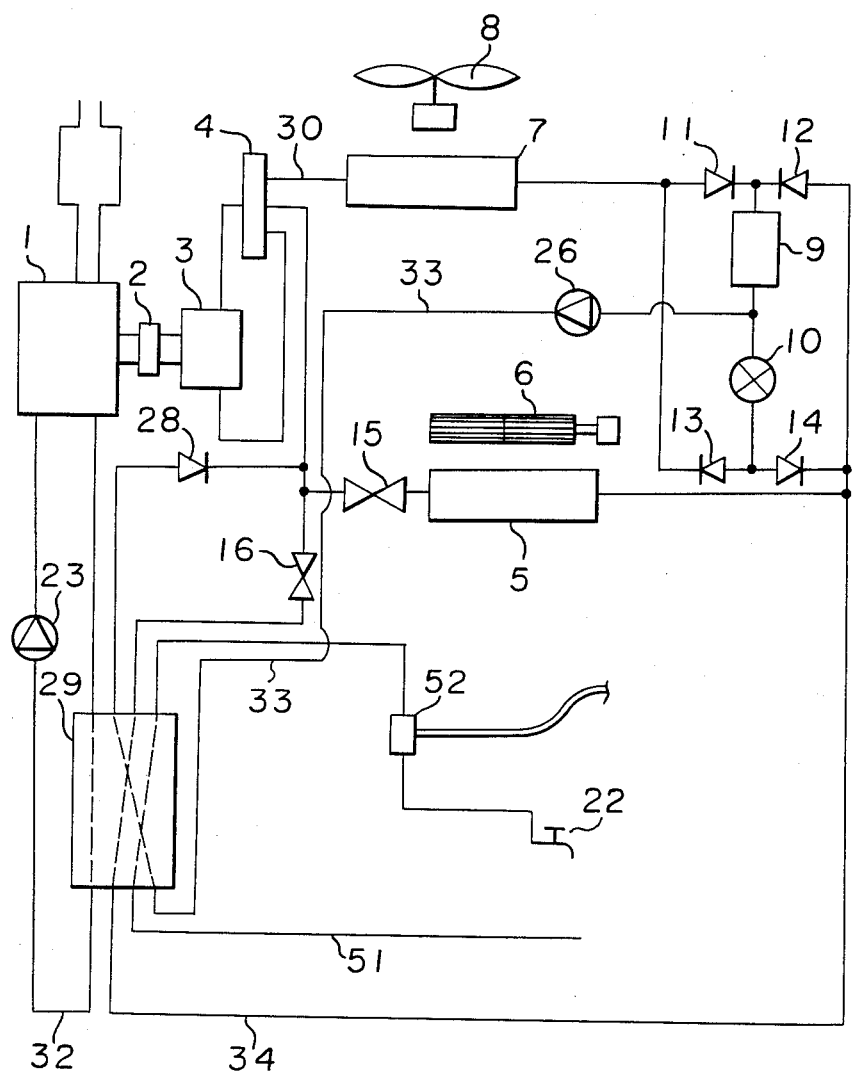
FIG. 5 is a diagram showing a refrigerant and water circuit of the apparatus according to the present invention.

FIG. 5 is a diagram showing another embodiment of the prime-motor-driven room warming/cooling and hot water supplying system of the present invention, wherein the same reference numerals as in FIG. 1 designate the same or corresponding parts.

In this embodiment, the water tank is eliminated and a city water is supplied to the third heat exchanger 29 during the hot water supplying operation. Since the temperature of the city water is relatively low and the temperature of the cooling water is also relatively low, the entire system can be effectively operated with a relatively low refrigerant pressure.

The circuit of the embodiment shown in FIG. 5 is identical with that shown in FIG. 1 provided that the water tank 19 and the water pump 20 are eliminated, hence there is no water circulating circuit 31. Instead of this, a pipe line 51 for feeding the city water is directly connected to the third heat exchanger 29 and a pipe line connecting the third heat exchangr to a water valve 22 is provided. A water-flow detecting switch 52 is attached in the intermediate of the pipe line extending from the third heat exchanger to the water valve 22. The switch 52 operates in such a manner that the contact is closed when it detects a predetermined flow rate or higher and an electric signal is outputted to a control device although it is not shown in FIG. 5.

When the water valve 22 is opened, a hot water which has been heated in the third heat exchanger 29 is available. In this case, the operation of the hot water supplying system is controlled by the signal from the water-flow detecting switch 52. Namely, the switch 52 detects a predetermined amount of flow rate of the water flowing through the water valve 22, such detection means that it is necessary to heat the water and the system is switched to the heat-pump hot-water supplying operation by means of the controller (not shown) installed in the apparatus.

The temperature of the city water is variable depending on seasons; for instance, it is about 25° C. at most in a summer season. On the other hand, in the hot water supplying system with the water tank, a hot water having a temperature ranging 40° C.–50° C. can be circulated. In this embodiment without the water tank, when the city water is to be directly serviced, the temperature of the water in a low level operation is about 25° C.

On the other hand, the condensed refrigerant and the cooling water for cooling the prime motor constitute heating sources for the water to be serviced. Accordingly, the temperature of the refrigerant and the cooling water always have higher temperatures than the water. When the temperature of the water is low, a low level of operation may be conducted for condensation of the refrigerant and the circulation of the cooling water. Accordingly, any restriction to the operations of the system is unecessary, whereby reduction in efficiency of the operations can be prevented.

Figure 6:
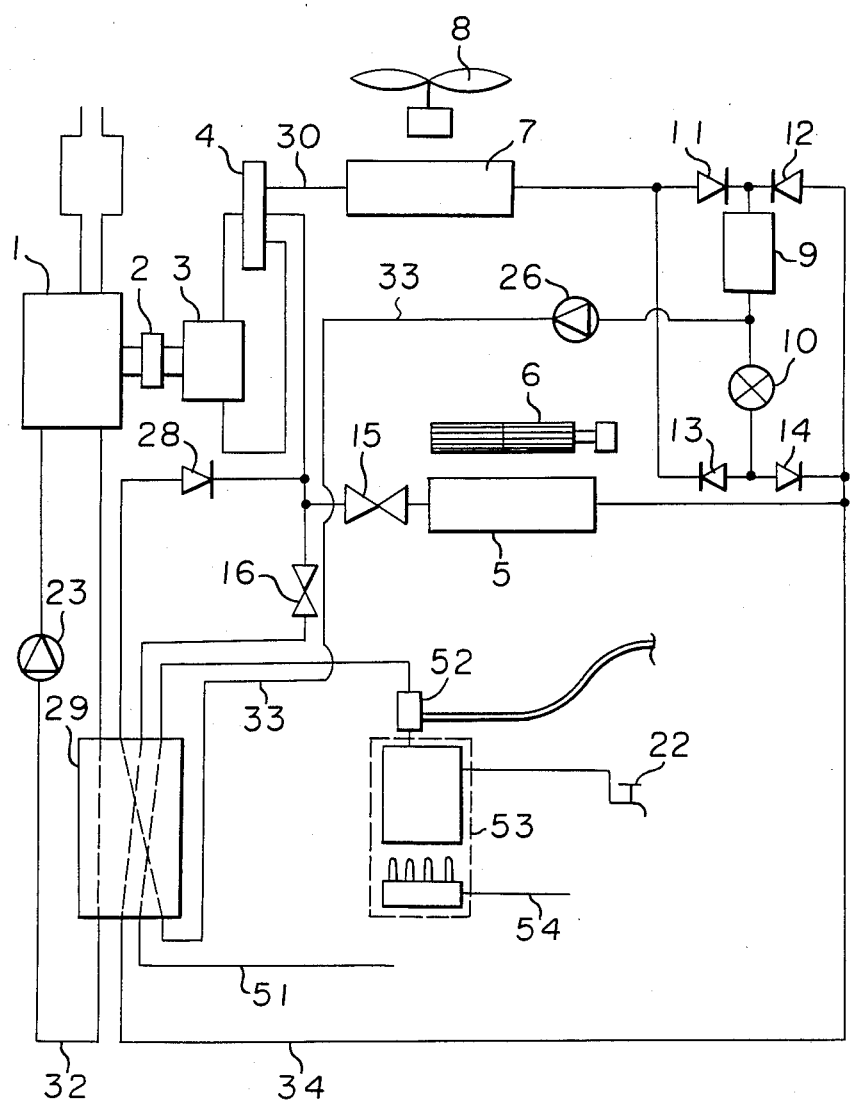
FIG. 6 is a diagram showing a refrigerant and water circuit of another embodiment of the present invention.

FIG. 6 is a circuit diagram showing still another embodiment of the present invention. The construction of the embodiment shown in FIG. 6 is identical with that shown in FIG. 5 provided that an auxiliary heating device 53 is disposed at the downstream of the water-flow detecting switch 52. The auxiliary heating device 53 may be an instantaneous gas boiler. A numeral 54 designates a pipe line for feeding a fuel gas for the instantaneous gas boiler 53.

The operation of the embodiment shown in FIG. 6 is similar to that of the embodiments shown in FIG. 1 and 5. However, when the hot water supplying operation is carried out by using the refrigerant from the heat pump circuit, the hot water heated by the third heat exchanger 29 is further heated in the instantaneous gas boiler 53, whereby a sufficiently hot water can be obtained. This embodiment is advantageous when it is used in a winter season. Namely, even though the temperature of the city water is low and it is not sufficiently heated by the third heat exchanger 29, a desired high temperature can be obtained by means of the auxiliary heating device 53. The water for services may be from a private well instead of the city water.

In this embodiment, the city water is directly fed to the third heat exchanger formed by the four coaxial, telescopic heat exchanging tube 5, in one piece. Accordingly, the temperature of the refrigerant may be low, hence the pressure of condensation of the refrigerant is low in the hot water supplying operation by using the refrigerant from the heat pump circuit, whereby the entire system can be operated at a high efficiency. Further, it is unnecessary to provide the water tank, whereby the manufacturing cost of the system is reduced.

Thus, in accordance with the present invention, the same function can be obtained by using a small number of the heat exchangers. Further, switching means and a temperature detecting means for the cooling water circuit are not required. In addition, a space for installing heat exchangers can be small, hence the size of the outdoor side unit is can be small and the construction is made simple and the manufacturing cost is reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A prime-motor-driven room-warming/cooling and hot water supplying apparatus which comprises:
   a heat pump circuit including a compressor driven by a prime motor, a first room side heat exchanger, a throttling device, a receiver and a second outdoor side heat exchanger, a cooling water circulating circuit connected to the prime motor and having means for circulating cooling water to cool the prime motor, a supplied water circuit separate from said cooling water circulating circuit, a refrigerant heating circuit extending from an intermediate portion of a pipe line connecting said receiver and said throttling device to said room side heat exchanger, a supplied water heating circuit for circulating refrigerant of a high temperature from said compressor, and a third heat exchanger which includes a part of said cooling water circulating circuit, said supplied water circuit, said refrigerant heating circuit and said supplied water heating circuit so as to perform mutual heat exchanging of the cooling water for said prime motor with said water in said supplied water circuit, said refrigerant in said supplied water heating circuit and said refrigerant in said refrigerant heating circuit, whereby water in said supplied water circuit is heated and cooling water in said water circulation circuit is cooled.

2. The prime-motor-driven room warming/cooling and hot water supplying apparatus according to claim 1, wherein said third heat exchanger is constituted by an outer tube for feeding condensed refrigerant and forming said part of said refrigerant heating circuit, a first heat transmission tube provided inside said outer tube to feed the water in said supplied water circuit and forming said part of said supplied water circuit, a second heat transmission tube provided inside said first heat transmission tube and forming said part of said cooling water circulating circuit to feed the water for cooling said prime motor, a third heat transmission tube provided inside said second heat transmission tube to feed a liquid refrigerant and forming said part of said supplied water heating circuit.

3. The prime-motor-driven room warming/cooling and hot water supplying apparatus according to claim 1, wherein said third heat exchanger is constituted by an outer tube for feeding the condensed refrigerant and forming said part of said refrigerant heating circuit, a first heat transmission tube provided inside said outer tube to feed the water in said supplied water circuit and forming said part of said supplied water circuit, a second heat transmission tube provided inside said first heat transmission tube and forming said part of said cooling water circulating circuit to feed the water for cooling said prime motor and a third heat transmission tube placed in parallel to and in contact with said second heat transmission tube inside said first heat transmission tube to feed the liquefied refrigerant and forming said part of said water heating circuit.

4. The prime-motor-driven room warming/cooling and hot water supplying apparatus according to claim 1, wherein said third heat exchanger has paths in which counter-currents are formed between the condensed refrigerant and the water in said cooling water circulating circuit or said supplied water circuit, and between said liquefied refrigerant and the cooling water.

5. The prime-motor-driven room warming/cooling and hot water supplying apparatus according to claim 1, including electromagnetic valves connected to said heat pump circuit and said supplied water heating circuit to selectively control the refrigerant to be circulated in said circuits.

6. The prime-motor-driven room warming/cooling and hot water supplying apparatus according to claim 1, wherein said supplied water circuit is a closed loop circuit including a water storage tank.

7. The prime-motor-driven room warming/cooling and hot water supplying apparatus according to claim 1, wherein said third heat exchanger directly receives a city water used for hot water supply and said supplied water circuit is provided with a water flow detecting switch for generating a signal to control the operation of said heat pump.

8. The prime-motor-driven room warming/cooling and hot water supplying apparatus according to claim 1, including an auxiliary heating device in said supplied water circuit at a position downstream of said third heat exchanger.

* * * * *